United States Patent [19]

Swoboda

[11] Patent Number: 4,656,570
[45] Date of Patent: Apr. 7, 1987

[54] SELF-BALANCING PUSH-PULL SQUARE WAVE CONVERTER TYPE OF SWITCHED POWER SUPPLY

[75] Inventor: Jack W. Swoboda, Los Angeles, Calif.

[73] Assignee: Pioneer Magnetics, Inc., Santa Monica, Calif.

[21] Appl. No.: 778,858

[22] Filed: Sep. 23, 1985

[51] Int. Cl.$^4$ ............................................ H02M 3/335
[52] U.S. Cl. ......................................... 363/26; 363/41
[58] Field of Search ....................... 363/24, 25, 26, 39, 363/41

[56] References Cited

U.S. PATENT DOCUMENTS 4,034,280  7/1977  Cronin et al. ........................... 363/25
4,070,701  1/1978  Harnden, Jr. et al. ................. 363/25

Primary Examiner—Patrick R. Salce
Assistant Examiner—Anita M. Ault
Attorney, Agent, or Firm—Keith D. Beecher

[57] ABSTRACT

A switched power supply of the self-balancing push-pull square-wave converter type which includes a pair of switching transistors connected to the primary of a transformer and which are driven by a square-wave oscillator, and which also includes a pre-regulator chopper connected to the transistors. A ripple voltage appears on the output of the pre-regulator which is a function of the current flow through the individual transistors, and this voltage is coupled through a capacitor and a series resistor to the square-wave oscillator to terminate the drive current through each transistor for each cycle in which the current flow through the transistor exceeds a predetermined maximum.

4 Claims, 3 Drawing Figures

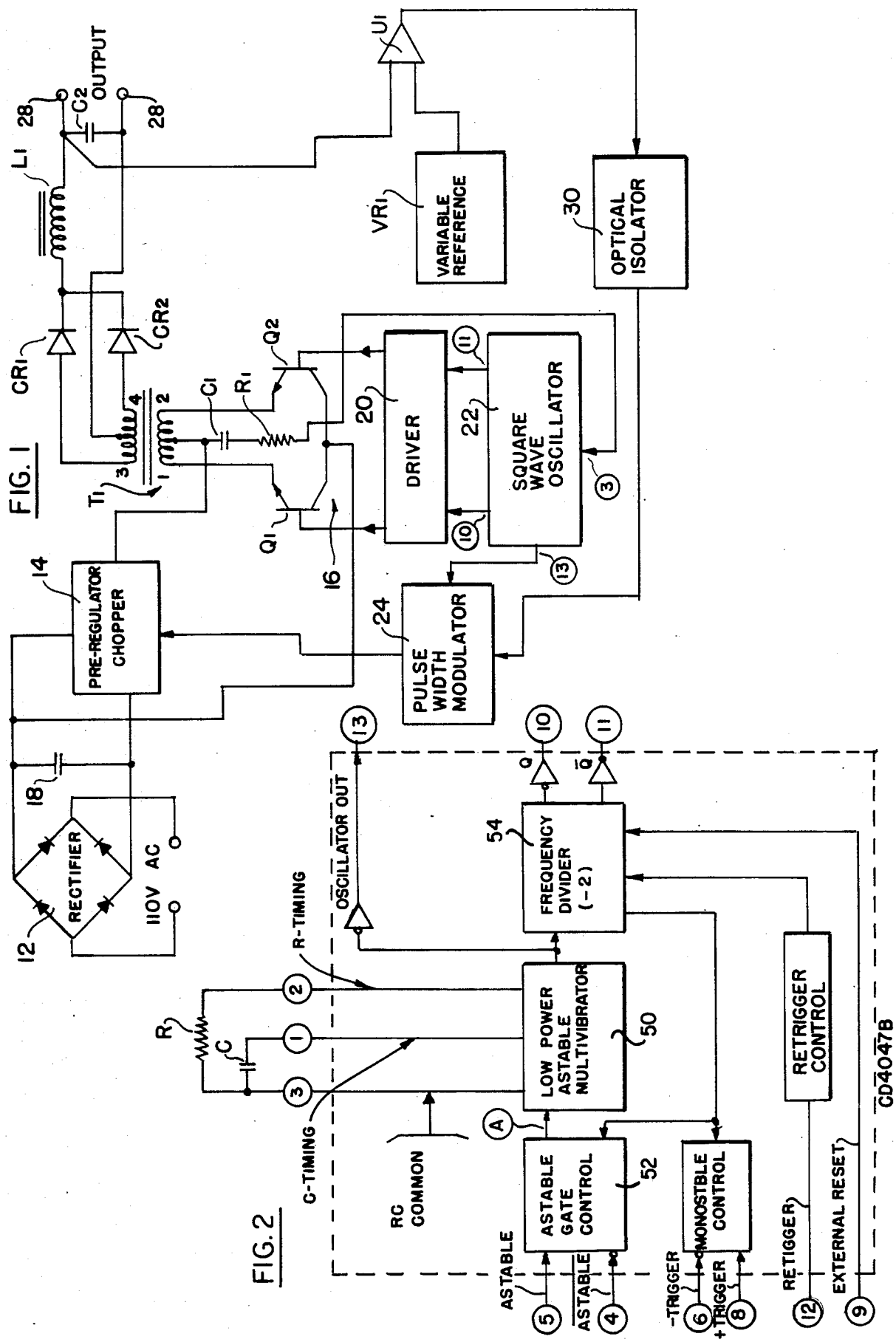

SELF-BALANCING PUSH-PULL SQUARE WAVE CONVERTER TYPE OF SWITCHED POWER SUPPLY

BACKGROUND OF THE INVENTION

There is an inherent balance problem in push-pull switching transistor controlled square wave converters. Should the circuit become unbalanced, one of the transistors conducts longer than the other, and the transformer core becomes saturated. This causes large peak currents to appear in the transistors. This condition is normally avoided by monitoring the current through the transistors, and if the current in either transistor exceeds a particular maximum, to terminate the drive pulse to that transistor so that the transformer core does not saturate.

Automatic self-balancing is achieved in the system of the invention so as to avoid such core saturation, and this is achieved in a simple and expeditious manner. As mentioned above, in accordance with the invention, a load dependent ripple voltage which appears on the output of the pre-regulator chopper is used to terminate the drive pulse to either transistor should the current through that transistor exceed a particular maximum.

The pre-regulator chopper has a finite impedance which causes a ripple voltage to be superimposed on its output which is dependent on the current flow through either of the transistors. In the practice of the invention, this ripple voltage is introduced to the square wave oscillator driving the transistors, and it serves to terminate the drive pulse from the oscillator to either one of the transistors when the current through that transistor exceeds a predetermined maximum.

BRIEF DESCRIPTION OF THE DRAWINGS

FIG. 1 is a block diagram of a balanced push-pull switched converter circuit incorporating the concept of the invention;

FIG. 2 is a circuit diagram of a square wave oscillator circuit included in the system of FIG. 1, and showing the connections from a pre-regulator chopper, which is also included in the circuit, and the square wave oscillator.

DETAILED DESCRIPTION OF THE ILLUSTRATED EMBODIMENT

Figure 3:
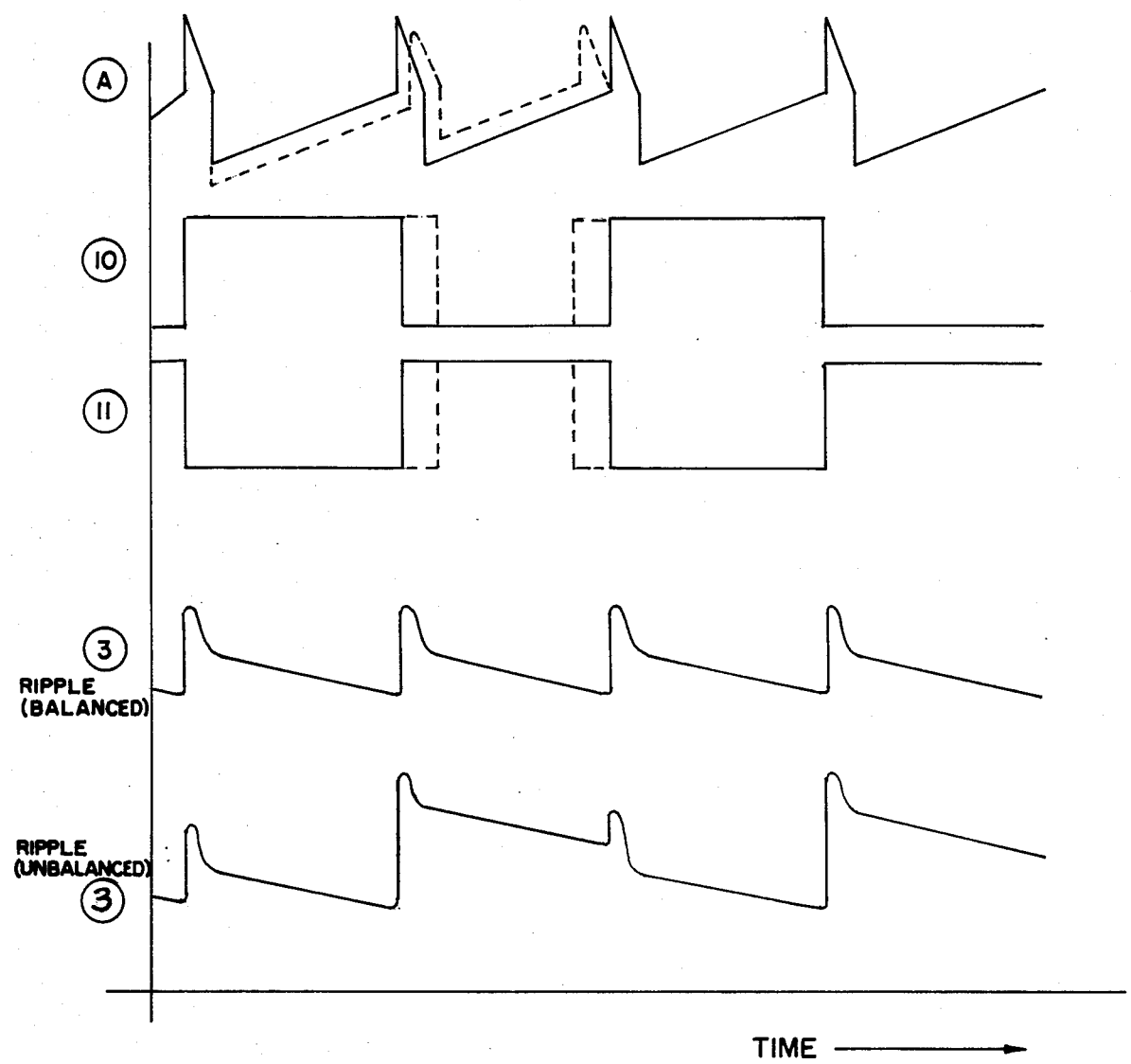
FIG. 3 is a series of curves useful in explaining the operation of the system of the invention.

The circuit of FIG. 1 includes an input circuit composed of input terminals 10, which are connected to the usual 110-volt alternating current mains, and which connect a typical rectifier 12 to the mains. Rectifier 12 produces a direct current output voltage which is introduced through a VMOS pre-regulator chopper 14 included in the input circuit to a typical push-pull inverter circuit 16. A capacitor 18 is connected across the output of rectifier 12 to provide input storage.

Inverter 16 includes a driver 20 which is controlled by a square wave oscillator 22. Driver 20 is connected to the basis of a pair of PNP switching transistors Q1 and Q2, as shown, which, in turn, have their emitters connected to the respective sides of primary winding 1-2 of a power output transformer T1. The input circuit introduces the regulated direct current input voltage between the center tap of the primary winding 1-2 of transformer T1 and the collectors of transistors Q1 and Q2 which are connected together. The square wave oscillator is also connected to a pulse width modulator 24 which controls the pre-regulator chopper 14.

Transformer T1 includes a secondary winding 3-4 which is connected through a pair of diodes CR1, CR2 and through a choke coil L1 to the output terminals 28 of the circuit.

The positive output terminal 28 is connected through a differential amplifier U1, and through an optical isolator 30, to the pulse width modulator 24 which, in turn, controls the pre-regulator chopper 14 to provide regulation control for the power supply. The other input of amplifier U1 is connected to a variable reference VR1 so that the output voltage of the system may be established.

The circuitry and components described above form a typical prior art push-pull balanced switch power supply, and it is believed that a detailed description of these known components is unnecessary.

As will be described in more detail in conjunction with FIG. 2, the output of the pre-regulator chopper 14 is AC coupled through a capacitor C1 and series resistor R1 to a flip-flop which is included in the square wave oscillator 22, and which serves as a 2:1 frequency divider for the output from the oscillator circuit.

Due to the fact that the pre-regulator chopper 14 has a finite impedance, there is a ripple voltage superimposed on the direct current regulated voltage introduced by the input circuit between the center tap of the primary winding of transformer T1 and the common collectors of transistors Q1 and Q2. The amplitude of this ripple voltage is a function of the current flow through either transistor Q1 or Q2.

This ripple voltage is coupled to the frequency divider section of square wave oscillator 22. Specifically, the square wave oscillator has two sections, one is the oscillator circuit itself, and the other is a flip-flop which functions as a frequency divider. Actually, in a specific embodiment, the oscillator circuit generates a 50 KHz signal, which is divided down by the frequency divider to a 25 KHz signal, the latter signal being applied to the bases of transistors Q1, Q2 in a push-pull manner.

The flip-flop is triggered by the leading edge of each square wave cycle generated by the oscillator. The trailing edge of the square wave which returns the flip-flop to its original condition during each cycle is made dependent on the amplitude of the ripple voltage from pre-regulator chopper 14.

Accordingly, each transistor Q1 and Q2 is cut off at the end of its conductive cycle at a time controlled by the amplitude of the ripple voltage from the pre-regulator chopper 14. In this way, the current flow through each transistor Q1 and Q2 is controlled so that it can not exceed a predetermined maximum. Therefore, the on-time of each transistor is controlled so that the system remains automatically balanced, and saturation of the core of transformer T1 is avoided.

The square wave oscillator 22 is shown in greater detail in FIG. 2, the circuit of FIG. 2 being contained on an integrated circuit chip of the type designated CD4047B.

The ripple voltage derived from the pre-regulator chopper 14 is applied to terminal 3 of the oscillator circuit, and this voltage in the balanced and unbalanced condition is represented by curves 3 of FIG. 3.

The square wave oscillator includes a low power astable multivibrator 50 which is controlled by an astable gate control circuit 52, whose output is represented by curve A in FIG. 3. The output from multivibrator 50 is divided on a 2:1 basis in frequency divider 54, and the output from frequency divider 54 is passed to output terminals 10 and 11 to driver 20 of FIG. 1, the square wave output being represented by curves 10 and 11 of FIG. 3.

The output of the multivibrator 50 is also applied directly, by way of terminal 13 to the pulse width modulator 24.

As the ripple voltage of curves 3 moves from the balanced to the unbalanced state, the triggering voltage A of the multivibrator 50 is shifted, as shown by the broken line of curve A. This causes the durations of the individual cycles of the square waves 10 and 11 to shift, as shown by the curves 10 and 11.

In the manner shown and described, the ripple voltage derived from the pre-regulator chopper 14 is used to maintain the control of the diodes Q1 and Q2 balanced, so that saturation of transformer T1, and excessive current through either of the transistors, is prevented.

The invention provides, therefore, a simple circuit for enabling the switched push-pull power supply automatically to maintain itself in a balanced condition.

Although a particular embodiment of the invention has been shown and described, modifications may be made. It is intended in the claims to cover all modifications which come within the true spirit and scope of the invention.

I claim:

1. A self-balancing push-pull switched power supply including: a power transformer having a primary winding and a secondary winding; an output circuit connected to said secondary winding; first and second switched transistors connected in push-pull relationship to the respective sides of the primary winding; an input circuit including a pre-regulator connected to the transistors and to an intermediate tap on the primary winding for introducing a direct current regulated input voltage to the power supply, said direct current regulated input voltage having a ripple voltage superimposed thereon having an amplitude which is a function of the current flow through either of said switching transistors; driver circuitry connected to said transistors for introducing 180° out-of-phase drive pulses to the transistors; and control circuitry coupling the output of said pre-regulator to said driver circuitry for introducing said ripple voltage to said driver circuitry so as to cause individual ones of said drive pulses to terminate when the current flow through a corresponding one of said first and second transistors reaches a predetermined maximum.

2. The combination defined in claim 1, in which said control circuitry comprises a series connected capacitor and resistor.

3. The combination defined in claim 1, in which said driver circuitry includes a multivibrator, and said control circuitry is connected to said multivibrator to trigger said multivibrator when the amplitude of said ripple voltage reaches a particular level.

4. The combination defined in claim 1, in which said first and second transistors have emitter electrodes connected to the respective sides of the primary winding, base electrodes connected to said driver circuitry, and collector electrodes connected together and to said pre-regulator.

* * * * *